United States Patent
Benisty et al.

(10) Patent No.: US 12,332,779 B2
(45) Date of Patent: Jun. 17, 2025

(54) DATA STORAGE DEVICE AND METHOD FOR RACE-BASED DATA ACCESS IN A MULTIPLE HOST MEMORY BUFFER SYSTEM

(71) Applicant: Western Digital Technologies, Inc., San Jose, CA (US)

(72) Inventors: Shay Benisty, Beer Sheva (IL); Ariel Navon, Revava (IL)

(73) Assignee: Sandisk Technologies, Inc., Milpitas, CA (US)

( * ) Notice: Subject to any disclaimer, the term of this patent is extended or adjusted under 35 U.S.C. 154(b) by 170 days.

(21) Appl. No.: 18/223,150

(22) Filed: Jul. 18, 2023

(65) Prior Publication Data

US 2024/0232068 A1    Jul. 11, 2024

Related U.S. Application Data

(60) Provisional application No. 63/437,169, filed on Jan. 5, 2023.

(51) Int. Cl.
*G06F 12/00* (2006.01)
*G06F 3/06* (2006.01)
*G06F 12/02* (2006.01)
*G06F 13/16* (2006.01)

(52) U.S. Cl.
CPC ......... *G06F 12/0246* (2013.01); *G06F 3/061* (2013.01); *G06F 3/0656* (2013.01); *G06F 3/0679* (2013.01); *G06F 13/1673* (2013.01); *G06F 2212/7203* (2013.01)

(58) Field of Classification Search
CPC ......... G06F 12/0246; G06F 2212/7203; G06F 13/1673; G06F 3/0656; G06F 3/0679; G06F 3/061
See application file for complete search history.

(56) References Cited

U.S. PATENT DOCUMENTS

| | | | |
|---|---|---|---|
| 10,007,433 | B2 | 6/2018 | Hahn |
| 10,268,584 | B2 | 4/2019 | Hahn |
| 10,521,118 | B2 | 12/2019 | Benisty et al. |
| 10,642,496 | B2 | 5/2020 | Benisty et al. |

(Continued)

OTHER PUBLICATIONS

U.S. Appl. No. 17/958,182, filed Sep. 30, 2022 entitled "HMB Multi-Segment Optimal Selection."

(Continued)

*Primary Examiner* — Reginald G Bragdon
*Assistant Examiner* — Michael L Westbrook
(74) *Attorney, Agent, or Firm* — Crowell & Moring LLP

(57) ABSTRACT

A data storage device and method for race-based data access in a multiple host memory buffer system are provided. In one embodiment, the data storage device stores data in a plurality of host memory buffers in the host instead of in just the host memory buffer usually associated with the data. To read the data, the data storage device sends read commands to all of the host memory buffers. That way, even if some of the host memory buffers are busy, the data can be returned from another one of the host memory buffers. In future reads in similar workloads, a read command can be sent to the host memory buffer that returned the data. Other embodiments are possible, and each of the embodiments can be used alone or together in combination.

19 Claims, 8 Drawing Sheets

(56) References Cited

U.S. PATENT DOCUMENTS

| | | |
|---|---|---|
| 10,929,285 B2 | 2/2021 | R et al. |
| 2011/0191540 A1* | 8/2011 | Chiu .................... G06F 3/0685 |
| | | 711/E12.017 |
| 2016/0224248 A1* | 8/2016 | Choi .................... G06F 9/45558 |
| 2016/0267016 A1 | 9/2016 | Lee et al. |
| 2017/0285940 A1 | 10/2017 | Benisty et al. |
| 2019/0146709 A1 | 5/2019 | Im et al. |
| 2020/0334159 A1 | 10/2020 | Lee et al. |
| 2022/0107758 A1 | 4/2022 | Benisty et al. |
| 2024/0094917 A1* | 3/2024 | Keil .................... G06F 3/0659 |

OTHER PUBLICATIONS

U.S. Appl. No. 17/854,312, filed Jun. 30, 2022 entitled "Data Storage Device and Method for Adaptive Host Memory Buffer Allocation Based on Virtual Function Prioritization."

* cited by examiner

DATA STORAGE DEVICE AND METHOD FOR RACE-BASED DATA ACCESS IN A MULTIPLE HOST MEMORY BUFFER SYSTEM

CROSS-REFERENCE TO RELATED APPLICATION

This application claims priority to U.S. provisional patent application No. 63/437,169, filed Jan. 5, 2023, which is hereby incorporated by reference.

BACKGROUND

In some storage protocols, a data storage device is allowed to utilize a portion of volatile memory in a host. The use of this memory (which is sometimes referred to as a host memory buffer (HMB)) can be vendor specific. In the Non-Volatile Memory Express (NVMe) specification, the host memory buffer is allocated for exclusive use by the data storage device's controller, data in the host memory buffer is not modified or accessed proactively by the host, and the host notifies the data storage device's controller before reusing the memory space in the host memory buffer for other purposes.

DETAILED DESCRIPTION

Overview

Figure 1A:
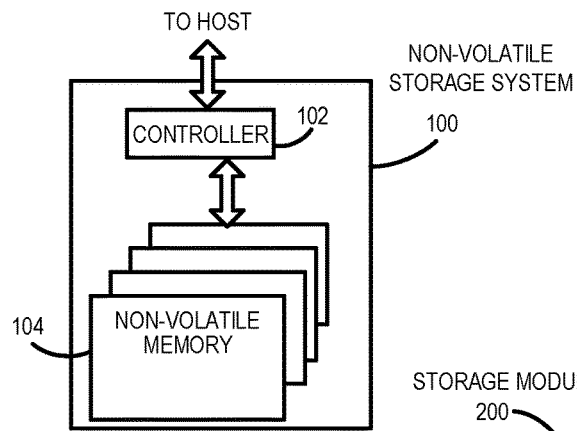
FIG. 1A is a block diagram of a data storage device of an embodiment.

By way of introduction, the below embodiments relate to a data storage device and method for race-based data access in a multiple host memory buffer system. In one embodiment, a data storage device is provided comprising a memory, an interface configured to communicate with a host comprising a plurality of host memory buffers, and a controller. The controller is configured to determine whether data should be stored in only one of the plurality of host memory buffers or in all of the plurality of host memory buffers; and in response to determining that the data should be stored in all of the plurality of host memory buffers, store the data in all of the plurality of host memory buffers.

In some embodiments, the controller is further configured to send read commands to all of the plurality of host memory buffers to read the data.

In some embodiments, the controller is further configured to track which one of the plurality of host memory buffers was first to return the data; and prioritize a future read command to the one of the plurality of host memory buffers.

In some embodiments, the controller is further configured to track a workload present when the read commands were sent to all of the plurality of host memory buffers; and prioritize the future read command in response to a workload present when the future read command is sent matching the workload present when the read commands were sent to all of the plurality of host memory buffers.

In some embodiments, the controller is further configured to determine that the data should be stored in all of the plurality of host memory buffers in response to determining that the data comprises critical data.

In some embodiments, the controller is further configured to determine that the data should be stored in all of the plurality of host memory buffers in response to determining that the data comprises a logical-to-physical address table related a frequently-accessed region.

In some embodiments, the controller is further configured to communicate with a first one of the plurality of host memory buffers via a first switch in the host and communicates with a second one of the plurality of host memory buffers via a second switch in the host.

In some embodiments, the controller comprises: a plurality of host memory buffer controllers; host memory buffer duplication logic; and a statistics monitoring module.

In some embodiments, the plurality of host memory buffers have a unified address space.

In some embodiments, each of the host memory buffers is associated with a different virtual function.

In some embodiments, the host comprises a single-root input/output virtualization (SR-IOV) interface.

In some embodiments, the memory comprises a three-dimensional memory.

In another embodiment, a method is provided that is performed in a data storage device in communication with a host comprising a plurality of host memory buffers, each host memory buffer being associated with a different virtual function. The method comprises: storing data associated with one of the plurality of virtual functions in all of the plurality of host memory buffers instead of only the host memory buffer associated with the one of the plurality of virtual functions; sending read commands to the plurality of host memory buffers to read the data; and tracking an order in which the plurality of host memory buffers returned the data.

In some embodiments, the method further comprises determining that the data should be stored in the plurality of host memory buffers instead of only the host memory buffer associated with the one of the plurality of virtual functions.

In some embodiments, the read commands are sent serially to the plurality of host memory buffers.

In some embodiments, the method further comprises prioritizing a future read command to one of the plurality of host memory buffers.

In some embodiments, the the data comprises a logical-to-physical address table related a frequently-accessed region.

In some embodiments, the plurality of host memory buffers have a unified address space.

In some embodiments, the host comprises a single-root input/output virtualization (SR-IOV) interface.

In another embodiments, a data storage device is provided comprising: a memory; an interface configured to communicate with a host comprising a plurality of host memory buffers and a plurality of virtual functions; means for storing data associated with one of the plurality of virtual functions in all of the plurality of host memory buffers instead of only the host memory buffer associated with the one of the plurality of virtual functions; means for sending read commands to the plurality of host memory buffers to read the data; and means for prioritizing a future read command to a host memory buffer of the plurality of host memory buffers that was a first to respond to the read commands.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
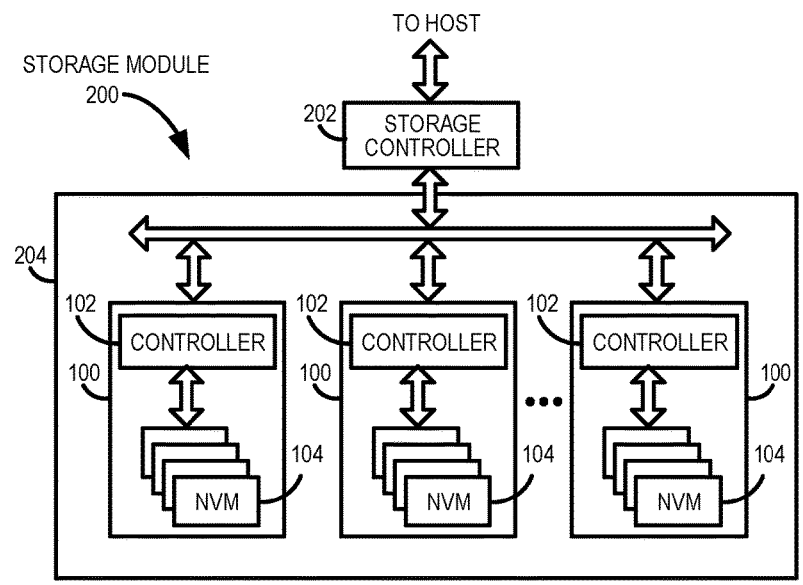
FIG. 1B is a block diagram illustrating a storage module of an embodiment.
Figure 1C:
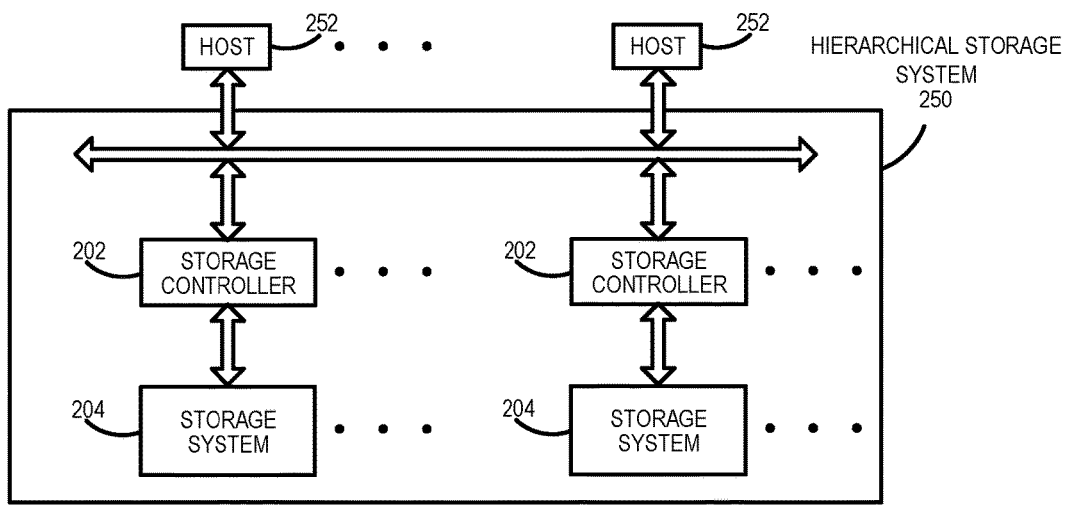
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
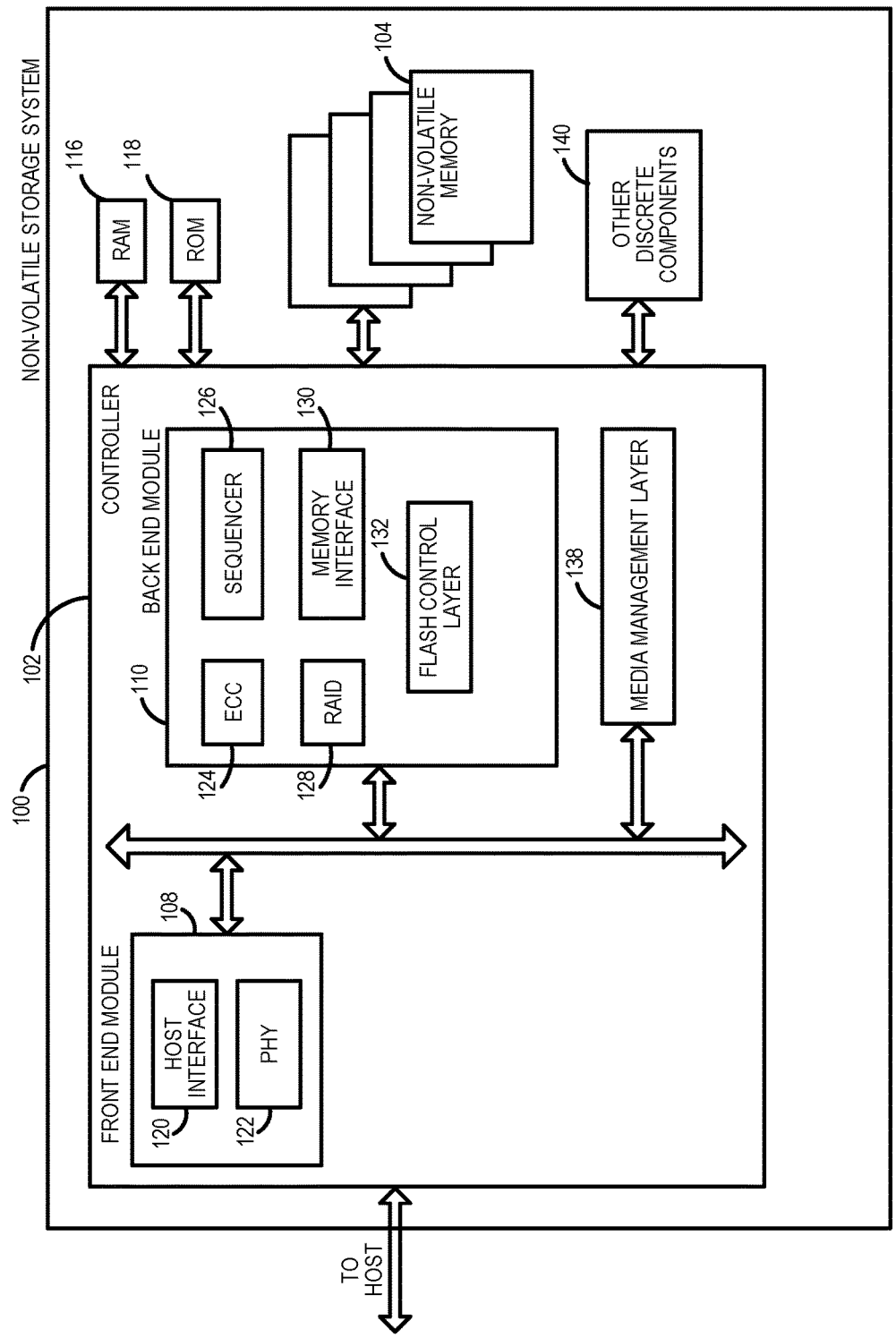
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
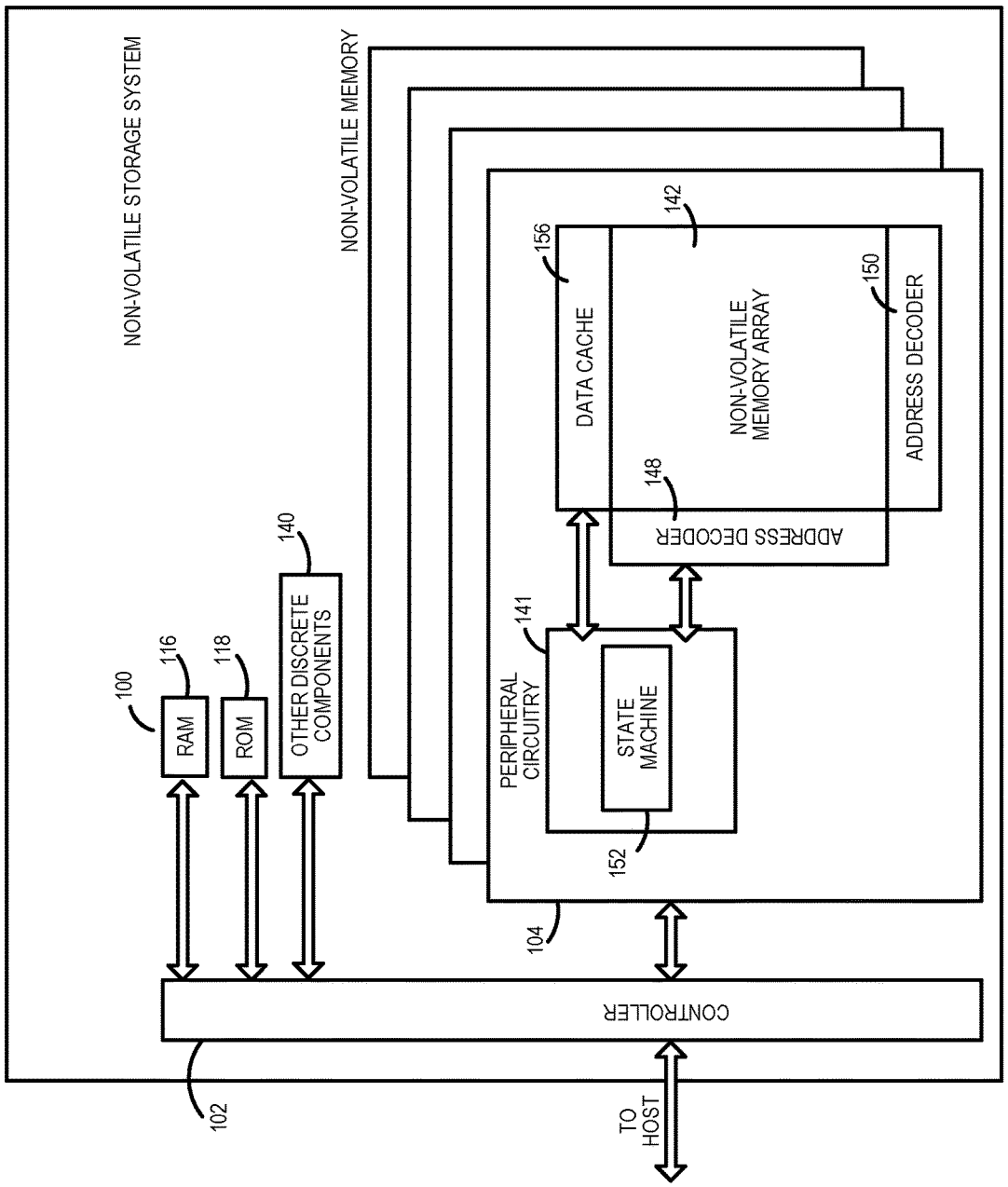
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
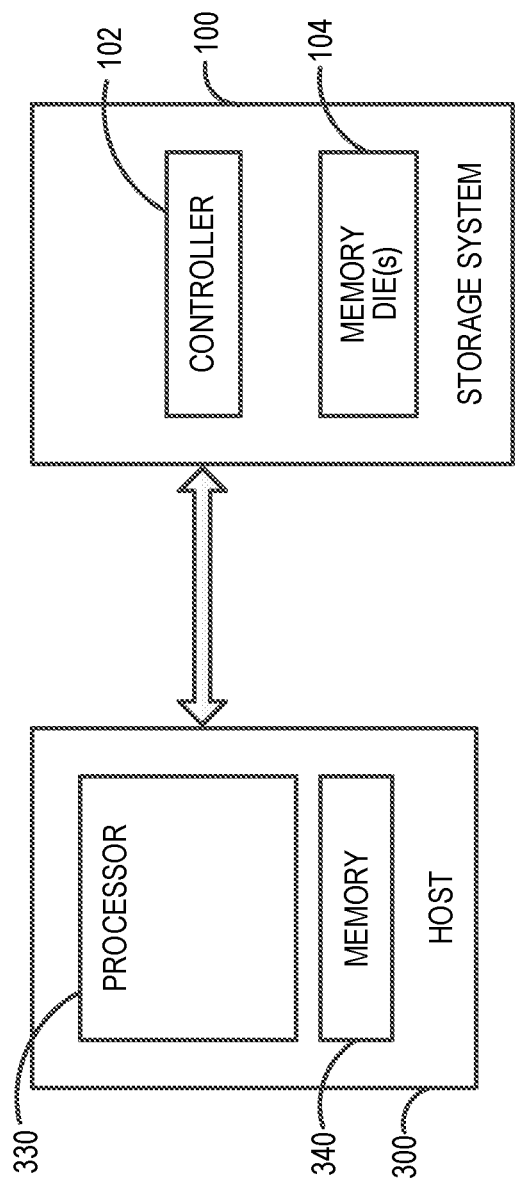
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, in some storage protocols, the data storage device 100 is allowed to utilize a designated portion of volatile memory 340 in the host 300 exclusively for use by the controller 102. That is, the designated memory resources allocated on the host 300 are for the exclusive use of the controller 102 (e.g., host software should not modify the ranges) until the host software requests that the controller 102 release the ranges. In one embodiment, the controller 102 is responsible for initializing the host memory resources. The use of this memory 340 (which is sometimes referred to as a host memory buffer (HMB)) can be vendor specific. For example, in the Non-Volatile Memory Express (NVMe) specification, the host memory buffer is allocated for exclusive use by the data storage device's controller 102, data in the host memory buffer 340 is not modified or accessed proactively by the host 300 (i.e., data is guaranteed to be valid), and the host 300 is obligated to notify the data storage device's controller 102 before any operation that might lead to data loss (e.g., in case of power loss or in case the host 300 might need the buffer) (in such cases, the host 300 lets the controller 102 acknowledge the operation before the data is lost). An HMB descriptor list on the host 300 can maintain a listing of entries associated with host data buffers for exclusive use by the controller 102. During initialization, the host software may provide the HMB descriptor list to the data storage device 100 for exclusive use by the controller 102.

Figure 4:
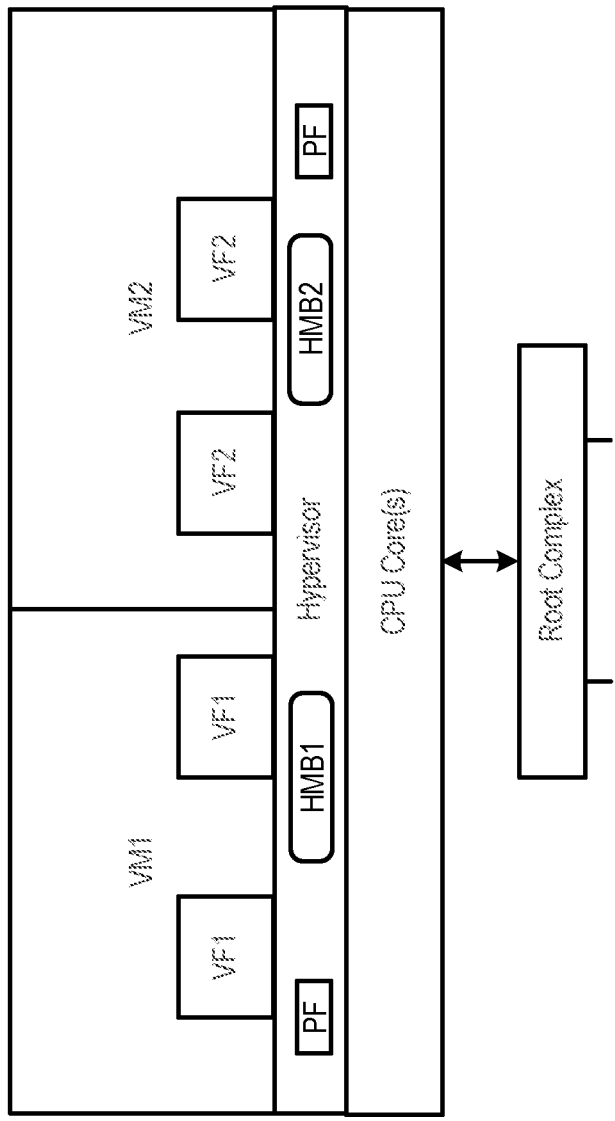
FIG. 4 is a block diagram of a single-root input/output virtualization (SR-IOV) system of an embodiment.

As also mentioned above, the interface between the controller 102 and the host 300 may be a peripheral component interconnect express (PCIe) interface. The single-root input/output virtualization (SR-IOV) interface is an extension to the Peripheral Component Interconnect Express (PCIe) specification and allows a device, such as a network adapter, separate access to its resources among various PCIe hardware functions. The SR-IOV interface allows a PCIe device to appear to be multiple PCIe devices and introduces the concept of physical functions (PF) (full-featured PCIe functions) and virtual functions (VFs) ("lightweight" functions that lack some configuration resources). FIG. 4 is a diagram of an SR-IOV interface of an embodiment. As shown in FIG. 4, the system comprises a root complex, CPU core(s), a hypervisor with two physical functions (PF), and two virtual machines (VM1, VM2), each with two virtual functions (VF1, VF2).

Each PF function may have an HMB space that is currently shared between the VFs equally per demand. The HMB has "global" usages such as storing flash translation layer (FTL) data that relates to all the VFs that correspond to the same PF, and "local" usages such as operating as a cache buffer (for data and control information) or storing read-look-ahead (RLA) or history pattern matcher (HPM) information that relate to each of the VFs alone. There are many different usages for the VF space. For example, the VF space can be used as a cache buffer to cache FTL entries that are specific to namespaces exclusively attached to that VF, to store recently-read/written data or other "hot" data that can be used for faster performance, or to store control data, such as NVMe-related pointers. The VF space can also be used for a read-look-ahead (RLA) mechanism to read data from the memory 104 ahead of a host read command for the data, which can be useful in sequential read. Additionally, the VF space can be used for a history pattern matcher (HPM) RAM (HPM-RAM) to store tables that are used during the operation of predicting the next random read address ahead of the host random read command by analyzing the history of its read patterns. The controller 102 may allocate a different HPM-RAM budget per each VF and change it dynamically. It should be noted that these are merely examples, and other use cases can be used.

The NVMe standard supports allocation of different HMBs for different physical functions as described above. The current reference approach is to unify all allocated HMB ranges into one large address space at least for the global usage of the HMB (e.g., FTL tables). This approach of concatenating all allocated HMB RAM spaces into a unified address space is practical for simple handling of the HMB RAM allocation; however, it is not utilizing the diversity provided by the different origin of the allocated HMB RAM spaces. The following embodiments can be used to provide a hybrid approach for handling multi-HMB allocation (from different hosts) for optimizing latency and performance of the data storage device 100.

In one embodiment, critical data (e.g., a logical-to-physical address table to hot regions) is duplicated and placed in several available HMBs. During read, the controller 102 will send read commands to all HMBs, and the first HMB that is available to read from will be used. As the read commands are transmitted in serial manner, the controller 102 can further keep track of the first HMB to respond per each typical workload and prioritize the command order accordingly, such that the first read command will be sent to the HMB that had the fastest response at a similar workload latency. With this embodiment, even if one HMB is busy, copies of critical data can still be read with low latency from another one of the HMBs. In another embodiment, a hybrid multi-HMB treatment is available where both the unified address space approach (which is simple to handle) can be used, but the multi-HMB approach is also available to compose the overall allocated HMB RAM for improving the response time and device performance.

Figure 5:
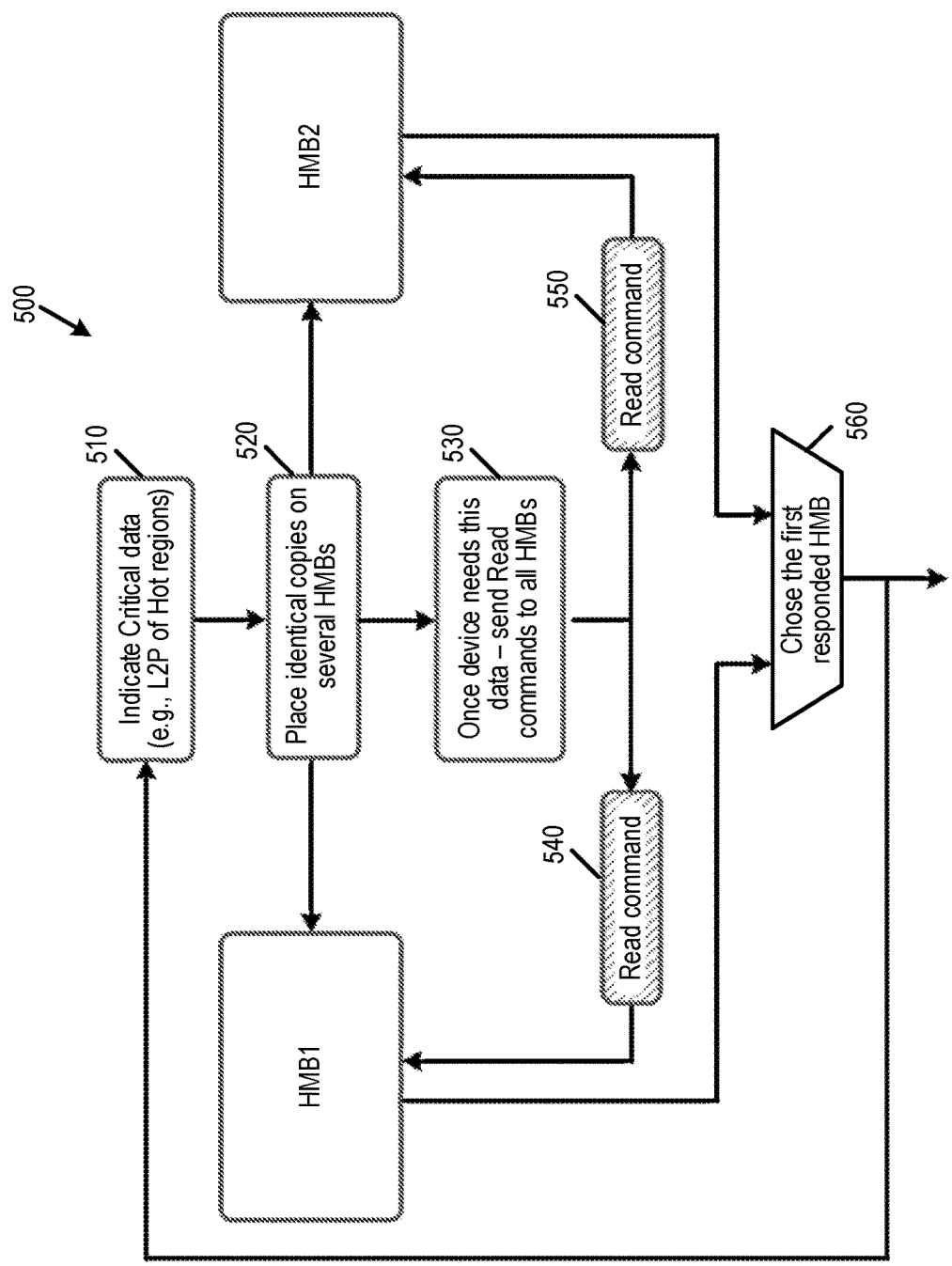
FIG. 5 is a flow chart of a method of an embodiment for race-based data access in a multiple host memory buffer system.

Turning again to the drawings, FIG. 5 is a flow chart 500 of a method of an embodiment for race-based data access in a multiple host memory buffer system. As shown in FIG. 5, the controller 102 of the data storage device 100 determines whether certain data is critical (act 510). In this example, critical data is a portion of a logical-to-physical address table (initially stored in the non-volatile memory 104) that relates to a region of logical addresses that are frequently accessed (i.e., "hot regions"). Critical data can be defined in any suitable way. For example, the controller 102 can maintain a data structure that lists data or address ranges that are considered critical or can provide some other threshold or criteria for assessing whether given data is critical.

When the controller 102 determines the data to be critical, the controller 102 places copies of the data in several HMBs on the host 300 (act 520). In the example shown in FIG. 5, copies of the data are stored in two HMBs (HMB1 and HMB2). Of course, this is just an example, and more than two HMBs can be used. Also, one of the "copies" of the data can be the "original" data. So, in this example, of the two copies, one is the source data, and the other is a copy of the source data. For convenience, the term "copy" will be used herein to refer to either data. When the controller 102 wants to read the data, the controller 102 sends read commands to all the HMBs (act 530). In this example, because there are two HMBs, the controller 102 sends two read commands 540, 550. The controller 102 then chooses the data from the first HMB that responds (act 560). As discussed above, the controller 102 can use this information to prioritize commands to the faster/fastest HMB in the future.

Figure 6:
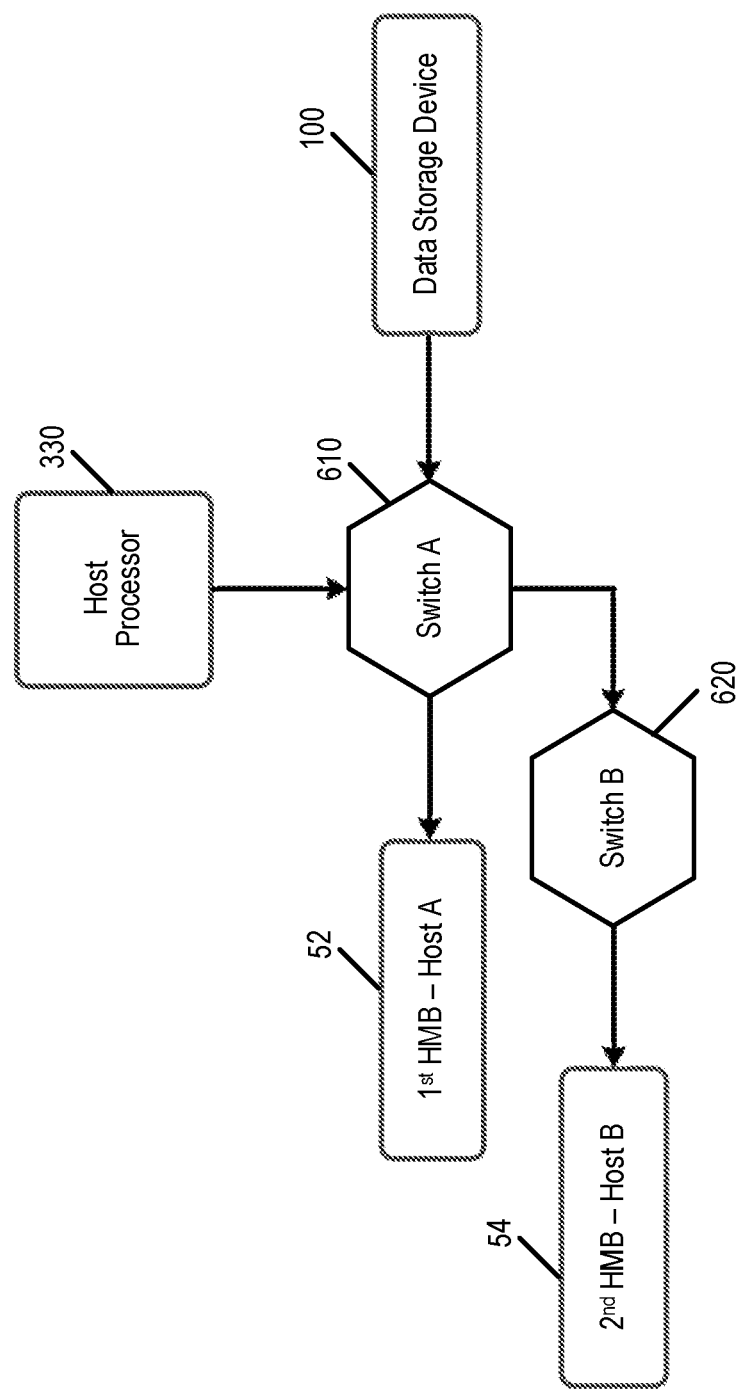
FIG. 6 is a flow chart of a switching mechanism of an embodiment.

Turning now to FIG. 6, FIG. 6 depicts an example when two HMBs are provided while their access attributes are not the same. As shown in FIG. 6, when the data storage device 100 sends a command to the host 300, a switch (Switch A) 610 in the host 300 is used to determine whether to route the command to the host processor 330 or to one of the HMBs. If the command is to access the first HMB 52, the command passes through a single switch (Switch A) 610. However, if the command is to access the second HMB 54, the command passes through two switches (Switch A and Switch B) 610, 620. This means that the access latency is higher when accessing the second HMB 54. Moreover, there might be a scenario where Switch A is almost idle while Switch B is locally stressed. In that scenario, the access latency to the second HMB 54 would be even higher.

Figure 7:
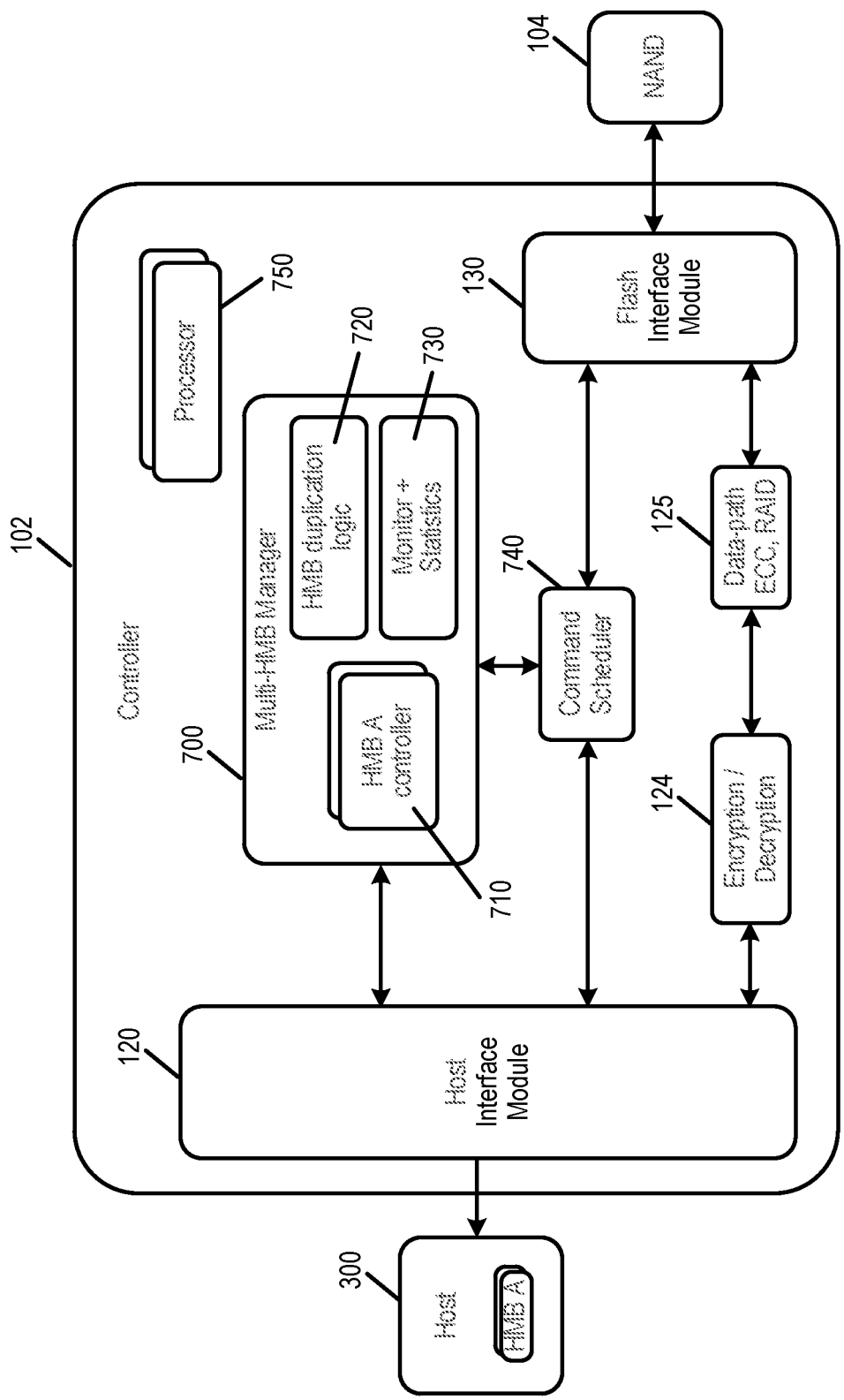
FIG. 7 is a block diagram of a host and controller of an embodiment.

FIG. 7 is a block diagram of one example implementation of the host 300 and controller 102 that can be used to implement the embodiments discussed above. As shown in FIG. 7, in this example, the host 300 comprises a plurality of host memory buffers (HMB A, HMB B, etc.). The controller 102 comprises a host interface module 120, an encryption/decryption module 124, a data path error correction code (ECC) and redundant array of independent drive (RAID) module 125, and a flash interface module 130 that communicates with the non-volatile memory (e.g., NAND) 104. The controller 102 also comprises one or more processors 750 and a multi-HMB manager 700, which is responsible for the interactions and management of the HMBs. The multi-HMB manager 700 comprises a controller for each HMB (e.g., HMB A controller, HMB B controller, etc.), HMB duplication logical 720 (e.g., for detecting potential HMB hot data and duplicating it in multiple HMBs), and monitor and statistics logic 730 (e.g., for monitoring HMB latencies and statistic collection), which can be an algorithm adaptive based on history. The manager 700 can be implemented by the one or more processors 750 executing computer-readable program code, which can be stored in the controller 102 or elsewhere in the data storage device 100.

The following is an example statistic table that collects statistic whenever accessing in-parallel multiple HMBs for getting the same data. For each workload, the number of times each HMB was the fastest is presented. Based on this information, the logic can be adapted to make smarter decisions.

|  | HMB A | HMB B |
| --- | --- | --- |
| Workload A (e.g. random read) | X1 times | X2 times |
| Workload B (e.g. sequential read) | Y1 times | Y2 times |
| ... | | |

In one embodiment, the "duplicate" logic could be disabled if one HMB is always the faster. In another embodiment, the logic can still continue storing and fetching the same data with multiple HMBs, but the command ordering would be based on history.

There are several advantages associated with these embodiments. For example, these embodiments can be used to maximize the utilization of a multi-HMB environment while getting the minimum possible latency for critical items stored in the HMBs. This can have a direct impact on random read performance especially in a low-queue depth environment.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory;
   an interface configured to communicate with a host comprising a plurality of host memory buffers; and
   one or more processors configured to communicate with the memory and the interface, wherein the one or more processors are further configured to:
      determine whether data should be stored in only one of the plurality of host memory buffers or in all of the plurality of host memory buffers, wherein it is determined that the data should be stored in all of the plurality of host memory buffers in response to determining that the data comprises a logical-to-physical address table related a frequently-accessed region; and
      in response to determining that the data should be stored in all of the plurality of host memory buffers, store the data in all of the plurality of host memory buffers.

2. The data storage device of claim 1, wherein the one or more processors are further configured to:
   send read commands to all of the plurality of host memory buffers to read the data.

3. The data storage device of claim 2, wherein the one or more processors are further configured to:
   track which one of the plurality of host memory buffers was first to return the data; and
   prioritize a future read command to the one of the plurality of host memory buffers.

4. The data storage device of claim 3, wherein the one or more processors are further configured to:
   track a workload present when the read commands were sent to all of the plurality of host memory buffers; and
   prioritize the future read command in response to a workload present when the future read command is sent matching the workload present when the read commands were sent to all of the plurality of host memory buffers.

5. The data storage device of claim 4, wherein the one or more processors are further configured to determine that the data should be stored in all of the plurality of host memory buffers in response to determining that the data comprises critical data.

6. The data storage device of claim 1, wherein the one or more processors are further configured to communicate with a first one of the plurality of host memory buffers via a first switch in the host and communicate with a second one of the plurality of host memory buffers via a second switch in the host.

7. The data storage device of claim 1, wherein the one or more processors are part of a controller that further comprises:
   a plurality of host memory buffer controllers;
   host memory buffer duplication logic; and
   a statistics monitoring module.

8. The data storage device of claim 1, wherein the plurality of host memory buffers have a unified address space.

9. The data storage device of claim 1, wherein the each of the host memory buffers is associated with a different virtual function.

10. The data storage device of claim 1, wherein the host comprises a single-root input/output virtualization (SR-IOV) interface.

11. The data storage device of claim 1, wherein the memory comprises a three-dimensional memory.

12. A method comprising:
performing the following in a data storage device in communication with a host comprising a plurality of host memory buffers, each host memory buffer being associated with a different virtual function:
  storing data associated with one of the plurality of virtual functions in all of the plurality of host memory buffers instead of only the host memory buffer associated with the one of the plurality of virtual functions;
  sending read commands to the plurality of host memory buffers to read the data; and
  tracking an order in which the plurality of host memory buffers returned the data.

13. The method of claim 12, further comprising determining that the data should be stored in the plurality of host memory buffers instead of only the host memory buffer associated with the one of the plurality of virtual functions.

14. The method of claim 12, wherein the read commands are sent serially to the plurality of host memory buffers.

15. The method of claim 12, further comprising
prioritizing a future read command to one of the plurality of host memory buffers.

16. The method of claim 12, wherein the data comprises a logical-to-physical address table related to a frequently-accessed region.

17. The method of claim 12, wherein the plurality of host memory buffers have a unified address space.

18. The method of claim 12, wherein the host comprises a single-root input/output virtualization (SR-IOV) interface.

19. A data storage device comprising:
a memory;
an interface configured to communicate with a host comprising a plurality of host memory buffers and a plurality of virtual functions;
means for storing data associated with one of the plurality of virtual functions in all of the plurality of host memory buffers instead of only the host memory buffer associated with the one of the plurality of virtual functions;
means for sending read commands to the plurality of host memory buffers to read the data; and
means for prioritizing a future read command to a host memory buffer of the plurality of host memory buffers that was a first to respond to the read commands.

* * * * *